United States Patent [19]
Hough et al.

[11] Patent Number: 5,728,287
[45] Date of Patent: Mar. 17, 1998

[54] METHOD AND APPARATUS FOR GENERATING OXYGENATED WATER

[75] Inventors: Gary S. Hough; David V. Carlson, both of Woodinville, Wash.

[73] Assignee: $H_2O$ Technologies, Ltd., Seattle, Wash.

[21] Appl. No.: 744,708

[22] Filed: Oct. 31, 1996

[51] Int. Cl.$^6$ .................................... C02F 1/461
[52] U.S. Cl. ............... 205/743; 205/742; 204/229; 204/269; 204/275
[58] Field of Search .......................... 205/742, 743; 204/229, 269, 275

[56] References Cited

U.S. PATENT DOCUMENTS

| | | | |
|---|---|---|---|
| 2,468,357 | 4/1949 | Brown | 204/248 |
| 2,864,750 | 12/1958 | Hughes, Jr. et al. | 204/149 |
| 3,095,365 | 6/1963 | Green | 204/229 |
| 3,523,891 | 8/1970 | Mehl | 210/44 |
| 3,654,119 | 4/1972 | White et al. | 204/228 |
| 3,725,245 | 4/1973 | Preis et al. | 204/275 |
| 3,728,245 | 4/1973 | Preis et al. | 204/275 |
| 3,819,504 | 6/1974 | Bennett | 204/289 |
| 3,865,710 | 2/1975 | Phipps | 204/228 |
| 3,925,176 | 12/1975 | Okert | 204/152 |
| 3,943,044 | 3/1976 | Fenn, III et al. | 204/149 |
| 4,017,375 | 4/1977 | Pohto | 204/255 |
| 4,119,517 | 10/1978 | Hengst | 204/229 |
| 4,132,620 | 1/1979 | Nidola et al. | 204/242 |
| 4,160,716 | 7/1979 | Wiseman | 204/270 |
| 4,179,347 | 12/1979 | Krause et al. | 205/743 |
| 4,180,445 | 12/1979 | Bennett et al. | 204/129 |
| 4,312,736 | 1/1982 | Menth et al. | 204/255 |
| 4,419,206 | 12/1983 | Frame | 204/228 |
| 4,425,216 | 1/1984 | Neymeyer | 204/270 |
| 4,436,601 | 3/1984 | Branchick et al. | 204/149 |
| 4,451,341 | 5/1984 | Miller | 204/149 |
| 4,528,083 | 7/1985 | LaConti et al. | 204/265 |
| 4,572,775 | 2/1986 | Paniagua | 204/229 |
| 4,623,436 | 11/1986 | Umehara | 204/149 |
| 4,639,303 | 1/1987 | Staab et al. | 204/258 |
| 4,761,208 | 8/1988 | Gram et al. | 204/95 |
| 4,781,805 | 11/1988 | Dahlgren | 204/149 |
| 4,783,246 | 11/1988 | Langeland et al. | 204/95 |
| 4,784,735 | 11/1988 | Sorenson | 204/98 |
| 4,790,914 | 12/1988 | Sorenson | 204/98 |
| 4,797,182 | 1/1989 | Beer et al. | 204/14.1 |
| 4,839,007 | 6/1989 | Kötz et al. | 240/149 |
| 4,917,782 | 4/1990 | Davies | 204/152 |
| 4,936,979 | 6/1990 | Brown | 210/85 |
| 5,062,940 | 11/1991 | Davies | 204/228 |
| 5,292,412 | 3/1994 | Pitton | 204/149 |
| 5,324,398 | 6/1994 | Erickson et al. | 204/149 |
| 5,328,584 | 7/1994 | Erickson et al. | 204/229 |
| 5,389,214 | 2/1995 | Erickson et al. | 204/149 |
| 5,427,667 | 6/1995 | Bakhir et al. | 204/260 |

FOREIGN PATENT DOCUMENTS

| 95/21795 | 8/1995 | WIPO |
| WO 95/21795 | 8/1995 | WIPO |

OTHER PUBLICATIONS

The Advanced Water Systems Incorporated, company brochure regarding information on various products to improve water quality, different types of water systems and current technology, Sep. 30, 1993.

*Primary Examiner*—Arun S. Phasge
*Attorney, Agent, or Firm*—Seed and Berry LLP

[57] ABSTRACT

A method and apparatus for generating oxygenated water are shown and described. A plurality of electrolytic cells are coupled to each other and to a source of water. A volume of water is drawn from the source, and forced through at least one of the electrolytic cells at a user desired flow rate. If the demanded rate of flow at the outlet exceeds a threshold flow rate through the electrolytic cell, a valve is opened and an additional volume of water flows through the second electrolytic cell to the discharge, the rate of flow through each electrolytic cell not exceeding the selected value. Additional cells are added as needed. A varying demand of oxygenated water is therefore met, while ensuring that the dissolved oxygen content of the water at the outlet does not fall below a selected value.

18 Claims, 7 Drawing Sheets

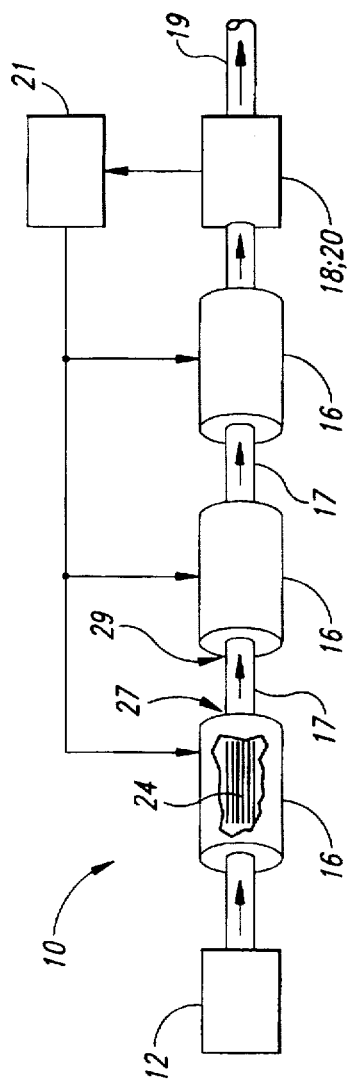
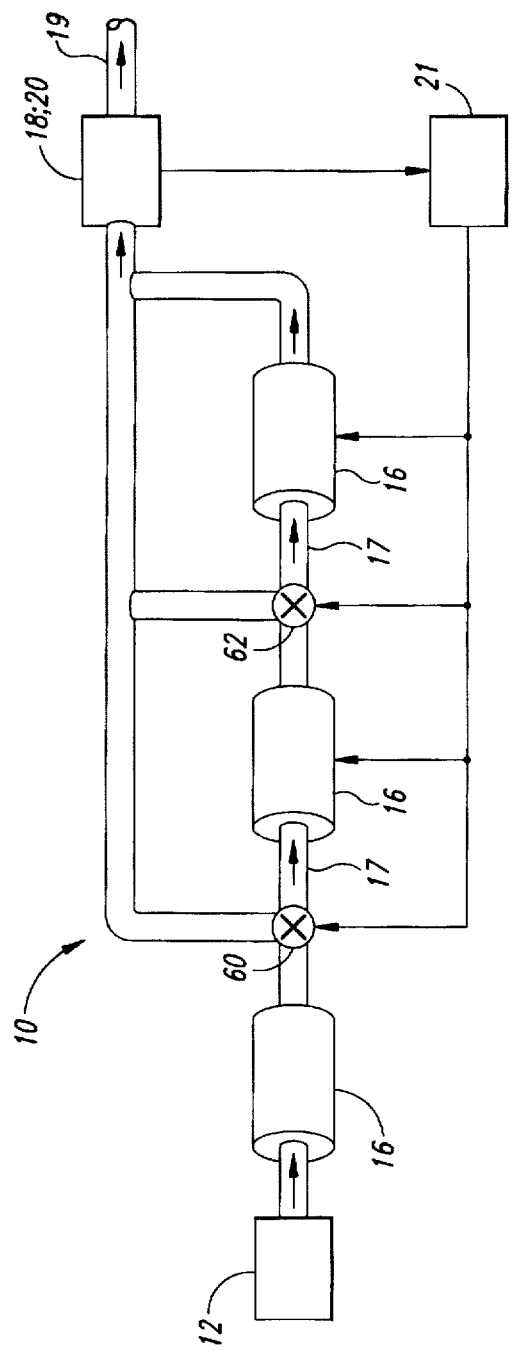
Fig. 5
Fig. 6

5,728,287

METHOD AND APPARATUS FOR GENERATING OXYGENATED WATER

TECHNICAL FIELD

This invention relates to an improved method and apparatus for generating a desired volume of water having a desired content of dissolved oxygen.

BACKGROUND OF THE INVENTION

Many benefits may be obtained through the use of water containing an elevated quantity of dissolved oxygen. For example, certain studies have shown that animals, such as chickens and turkeys, grow heavier for a given grain consumption if their drinking water has elevated oxygen levels. Increased levels of oxygen in water have been shown to purify the water, removing or neutralizing a variety of biological and chemical contaminants. Further, it is believed that humans may obtain certain health benefits by consuming oxygenated water.

The oxygen content of water may be increased via electrolysis, a process that is well known in the art. Typically, current is supplied to a cathode and an anode positioned in a water solution. The passage of electricity through the solution splits the water molecule causing the formation of hydrogen and oxygen gas. The hydrogen tends to bubble out of solution, whereas a certain quantity of the oxygen molecules are trapped by the water molecules and remain in solution, thereby increasing the dissolved oxygen content of the water.

Currently available systems for oxygenating water with electrolytic cells may not reach desired levels of dissolved oxygen, nor do they function as efficiently as desired. Accordingly, there is a need in the art for an improved system for increasing the dissolved oxygen content of water to desired levels at an improved efficiency and speed.

SUMMARY OF THE INVENTION

The present invention provides an improved method and apparatus for generating oxygenated water that is ensured of having a certain dissolved oxygen level. A plurality of electrolytic cells are coupled to a water supply line under pressure. Water is removed from the supply line at a variable rate, as selected by a user. The rate of flow through any one cell is less than the treatment capacity of that cell. If the user demanded flow rate exceeds the treatment capacity of one cell, the water flow is caused to pass through a second cell to ensure that the water at the exit has a minimum desired oxygen content.

In one embodiment, the electrolytic cells are coupled together in a parallel arrangement. A valve is positioned between successive cells. The outlet has a valve, such that the user may draw water from the system at a user desired rate. If the demanded flow rate at the outlet does not exceed a threshold flow rate through the electrolytic cell, the valve between successive cells is closed, and the water flows through the first electrolytic cell at the user desired rate.

If the demanded rate of flow from the outlet exceeds the threshold rate of flow through the electrolytic cell, the valve is opened, and water flows through more than one electrolytic cell to the outlet, the rate of flow through each cell not exceeding the threshold flow rate which is the treatment rate for that cell. In this manner, varying flow rates demanded at the outlet are accommodated, while the flow rate through any one electrolytic cell does not exceed its own treatment rate, thereby ensuring that the dissolved oxygen content of the water at the outlet is maintained at or near a desired level.

In an alternative embodiment, the electrolytic cells are coupled together in series with valves in between, such that the volume of water flows through one electrolytic cell to another, passing through each successive electrolytic cell prior to reaching the outlet. The dissolved oxygen content of the water will increase as the water flows through each successive electrolytic cell. The dissolved oxygen content of the water may be measured after each electrolytic cell or at the outlet, the water being passed through additional electrolytic cells until a desired dissolved oxygen content is reached.

BRIEF DESCRIPTION OF THE DRAWINGS

FIG. 5 is a schematic of a system provided in accordance with an alternative embodiment of the present invention.

FIG. 6 is a schematic of a system provided in accordance with an alternative embodiment of the present invention.

DETAILED DESCRIPTION OF THE INVENTION

There is a need for an efficient, cost-effective system for generating water having elevated levels of dissolved oxygen at a variety of different flow rates. A system making use of the present invention meets these needs.

Figure 1A:
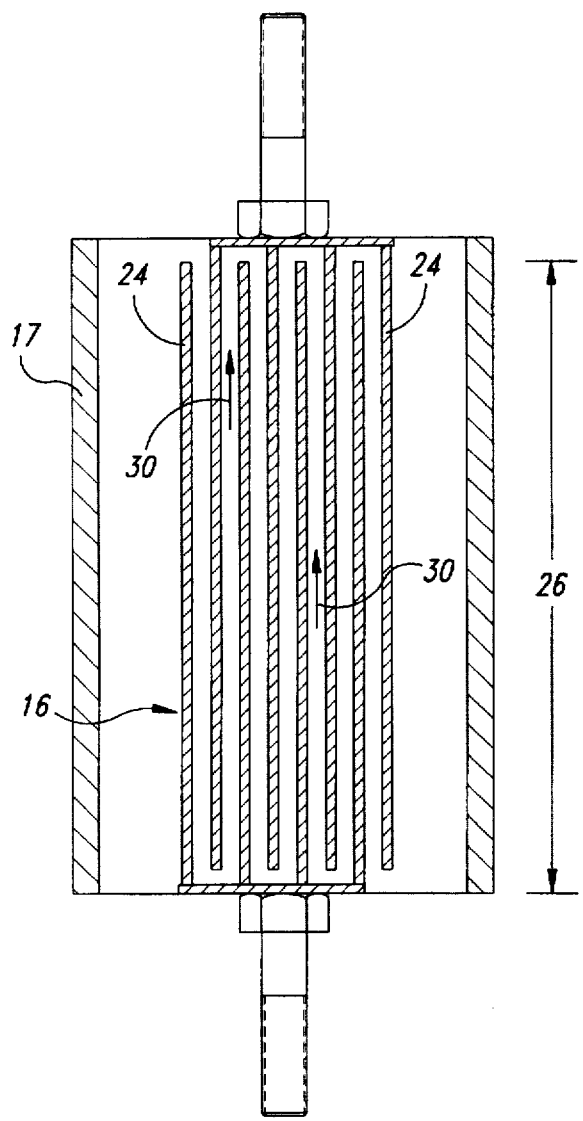
FIG. 1A is a cross-sectional elevational view of an exemplary electrolytic cell.
Figure 1B:
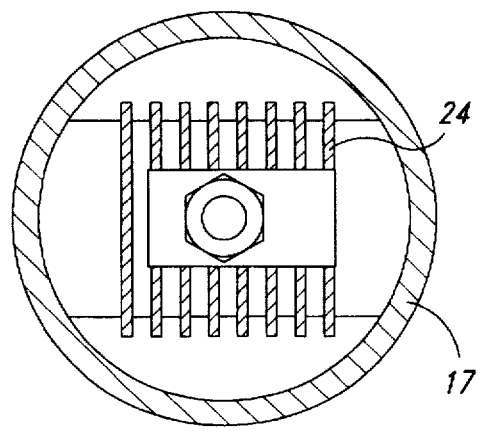
FIG. 1B is a top plan view of the electrolytic cell illustrated in FIG. 1A.
Figure 1C:
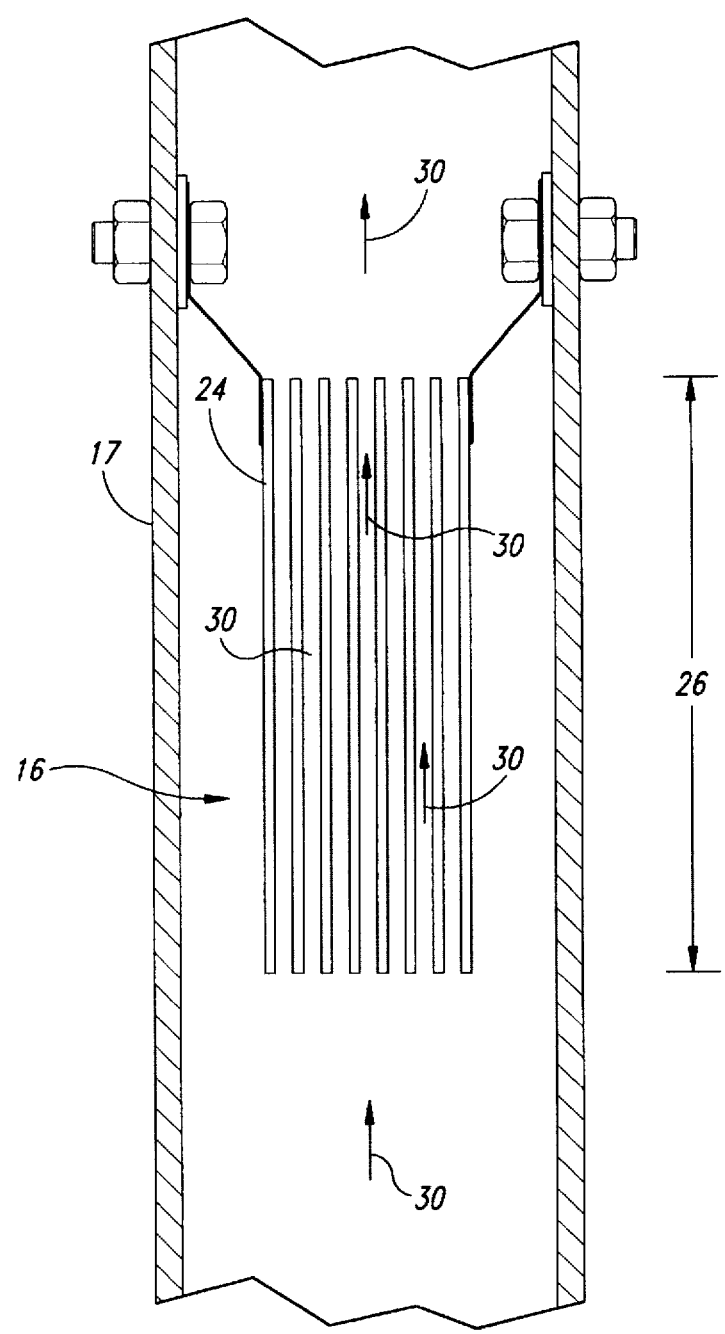
FIG. 1C is a cross-sectional elevational view of an alternative, exemplary electrolytic cell.

FIGS. 1A and 1B show an electrolytic cell 16 for treating water to increase the dissolved oxygen within the water. The use of electrolytic cells to increase the dissolved oxygen within water is well known in the art. An alternative electrolytic cell is illustrated in FIG. 1C. Two examples of an electrolytic cell are provided for background purposes. However, it is to be understood that any one of the many suitable electrolytic cells for generating dissolved oxygen in water are acceptable.

The electrolytic cell 16 is positioned within a pipe 17 through which a flow of water 30 is passing. Positioned within the water flow are electrodes 24 which are coupled to a source of electric current in a manner well known in the art. The electric current passes through the water when it flows from one electrode to another, thus converting some of the water molecules into hydrogen and oxygen, each in the form of a gas. A portion of the oxygen molecules remain trapped in the water, becoming dissolved oxygen, thereby increasing the dissolved oxygen content of the water.

The rate at which a particular electrolytic cell 16 can treat a flow of water depends on a number of factors based on that particular electrolytic cell, as well as properties of the water. Generally, if the water passes through the cell more slowly, a greater dissolved oxygen content will be placed into the water upon exit because it has been exposed to the electric current for a longer period of time. Conversely, if the water passes through the cell more quickly, the dissolved oxygen content will not be as great. For a system, there is a target dissolved oxygen level to ensure treatment of the water. If the flow rate exceeds a threshold value, beyond the treatment value rate of the cell, then the dissolved oxygen content of the exiting water is below the desired target value and the water has not been sufficiently treated.

Normally, a single cell has a maximum possible treatment rate to achieve a certain dissolved oxygen level of water. If the treatment is to remain effective, the flow rate must not exceed the threshold rate for that particular electrolytic cell. The user wants to be assured that the dissolved oxygen content of water exiting from the system is always above a target level even though the rate of flow may vary.

Figure 2:
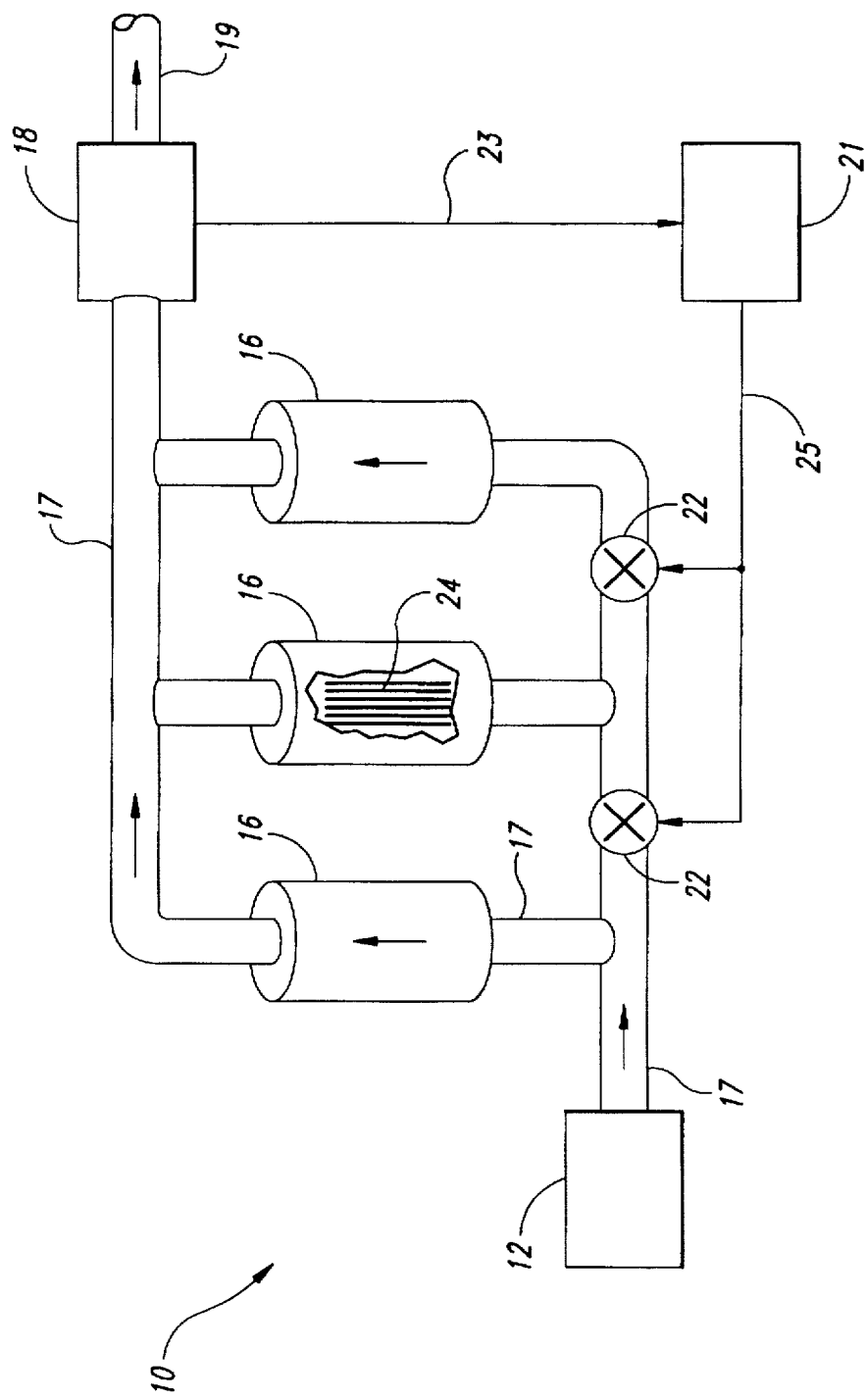
FIG. 2 is a schematic of a system provided in accordance with an embodiment of the present invention.

FIG. 2 illustrates a system according to principles of the present invention. A source of water under pressure 12 is connected via pipe 17 to a plurality of electrolytic cells 16. The electrolytic cells 16 are connected via pipe 17 to a flow rate meter 18. Water exiting from the flow rate meter 18 via pipe 19 is provided to a user. Valves 22 control the flow to the electrolytic cells beyond the first cell.

According to principles of the present invention, water flows from the source of water under pressure 12 through pipe 17 and into a first electrolytic cell 16. Water exits from the electrolytic cell 16 to a water pipe 17, through a flow measurement device 18 and then to a user system via line 19. The flow rate meter 18 measures the rate at which water is flowing out of the pipe 17 and into the user system. This information is provided via electronic cables 23 to a central electronic control system 21.

The source of water under pressure may be supplied by any one of a number of well known, prior art techniques. For example, the system 12 may include a pump connected to a source of water and the control of the pump being sensitive to the pressure in the line. The pump may turn on whenever the pressure drops below a certain pounds per square inch (psi), to ensure that the water in the pipe always remains at a sufficiently high pressure for delivery to the user out of the end pipe 19. Such water pumps and pressure control systems have been well known in the art for many years. Alternatively, the source 12 of water under pressure may be the water pressure line from a municipality, local water district or other water supply organization. The local organization ensures that the water maintains sufficient pressure and the user need not be concerned with, and often does not know, the technique by which the pressure is maintained in the line. These could, for example, be a water tower, series of large pumping stations, an artesian well, or any of the many known techniques for providing a source of water under pressure.

Water flow rate measuring device 18 may be any acceptable flow rate sensor, many being known in the art. Valves 22 are any electronically controlled valve, such as a solenoid valve of a type known in the art.

The electronic control system 21 controls valves 22 to provide the desired treated flow rate to outlet pipe 19. This may be nothing more than a simple switch that changes state if the flow rate exceeds the maximum allowable treatment rate of a particular electrolytic cell 16. Of course, in some embodiments, information regarding the treatment rate of each electrolytic cell 16 is stored in electronic control unit 21. For example, it may include a small microcomputer with on-board memory which has stored therein the desired optimum flow rate, a minimum flow rate, and a maximum permissible flow rate for each respective electrolytic cell 16.

The user removes water via the outlet pipe 19 at a user selected rate. The user may be any one of a number of different entities. In one system, the user is a flock of chickens or other poultry. As is known in the husbandry field, water is provided under pressure to the poultry house. When the chickens are thirsty, they take water from the water source and draw a desired volume of water. During different times of the day, such as early morning or shortly after the afternoon feeding, many chickens in the flock desire a drink of water. With many chickens drinking simultaneously from the same water supply, the flow of water becomes quite large. At other times during the day, the water demanded by the chicken flock is lower. At night, the water demanded by the chicken flock may be quite low. Nevertheless, some chickens within the flock may wish to have a drink at night and while the flow may be at a minimum level, there will nevertheless be some desire on the part of the users, in this instance chickens in a flock, to use the water.

The flow rate of water through the outlet pipe 19 to the chicken flock varies greatly, according to the demand by the chicken flock. The source of water 12 is always held at sufficient pressure and has sufficient volume to deliver the desired volume of water at the maximum desired flow rate. The system contains the appropriate valves and control systems to deliver water at the desired rate, such flow systems being well known in the poultry an for many years. Although the above example describes the system in use for chickens, the system may be used in any husbandry environment.

Alternatively, the user may be a family in a household. As will be appreciated, during early mornings, a large volume of water may be desired by the users for such purposes as making coffee, breakfast drinks, or other activities as they begin the day. During the day, the water demanded by the users in a household is considerably less. However, during certain hours in the evening, the water demand may again be quite high.

The users may also represent a municipality or industrial or commercial business desiring water which has been treated with an increased dissolved oxygen content. The business would like the flexibility of being able to draw water at a variable rate, according to its desired needs, and not be limited to a particular flow rate as dictated by the treatment rate of a particular cell.

Each particular use of the treated water exiting at pipe 19 has a desired dissolved oxygen level. According to principles of the present invention, the system ensures that the dissolved oxygen level is maintained at or above the desired target level. For example, for chickens, the desired dissolved oxygen level is above 12 parts per million (ppm) and for some uses is in the 14–18 ppm range. For some users, a dissolved oxygen level in the range of 10–12 ppm may be acceptable whereas, for other environments, a dissolved oxygen content in the range of 12–15 or possibly even higher may be desired. The system controller is able to determine the dissolved oxygen level which is desired and then set the system to maintain this level.

An electronic control line 25 exiting the electronic control unit 21 is connected to valves 22 in between successive electrolytic cells 16. If both of the valves 22 are closed, the water flow is forced to pass through only a single electrolytic cell 16 for delivery to the user via line 19. If the flow rate is less than a threshold value, then a single electrolytic cell 16 is used to treat the water. The threshold value is selected based on the user and the end system. The flow rate threshold value will usually be somewhat less than the maximum treatment flow rate for an electrolytic cell 16 to ensure that all water exiting is sufficiently treated.

In the event the water exiting the system exceeds a flow rate which is greater than the threshold value, the electronic controls 21 will cause one or both of the valves 22 to be opened. When a valve 22 is opened, the respective electrolytic cells are also turned on so they begin treatment of the water. The water then flows in parallel through two, three, or possibly more electrolytic cells. Each of the cells draw water from the same source 12 and output water onto a common line 17. Since each of the electrolytic cells individually has water flowing therethrough at slower than its treatment rate, all of the water exiting through the pipe 19 is properly treated. The overall volume of water being provided is significantly increased because two or more electrolytic cells are treating water simultaneously, thu of treated water.

Figure 7:
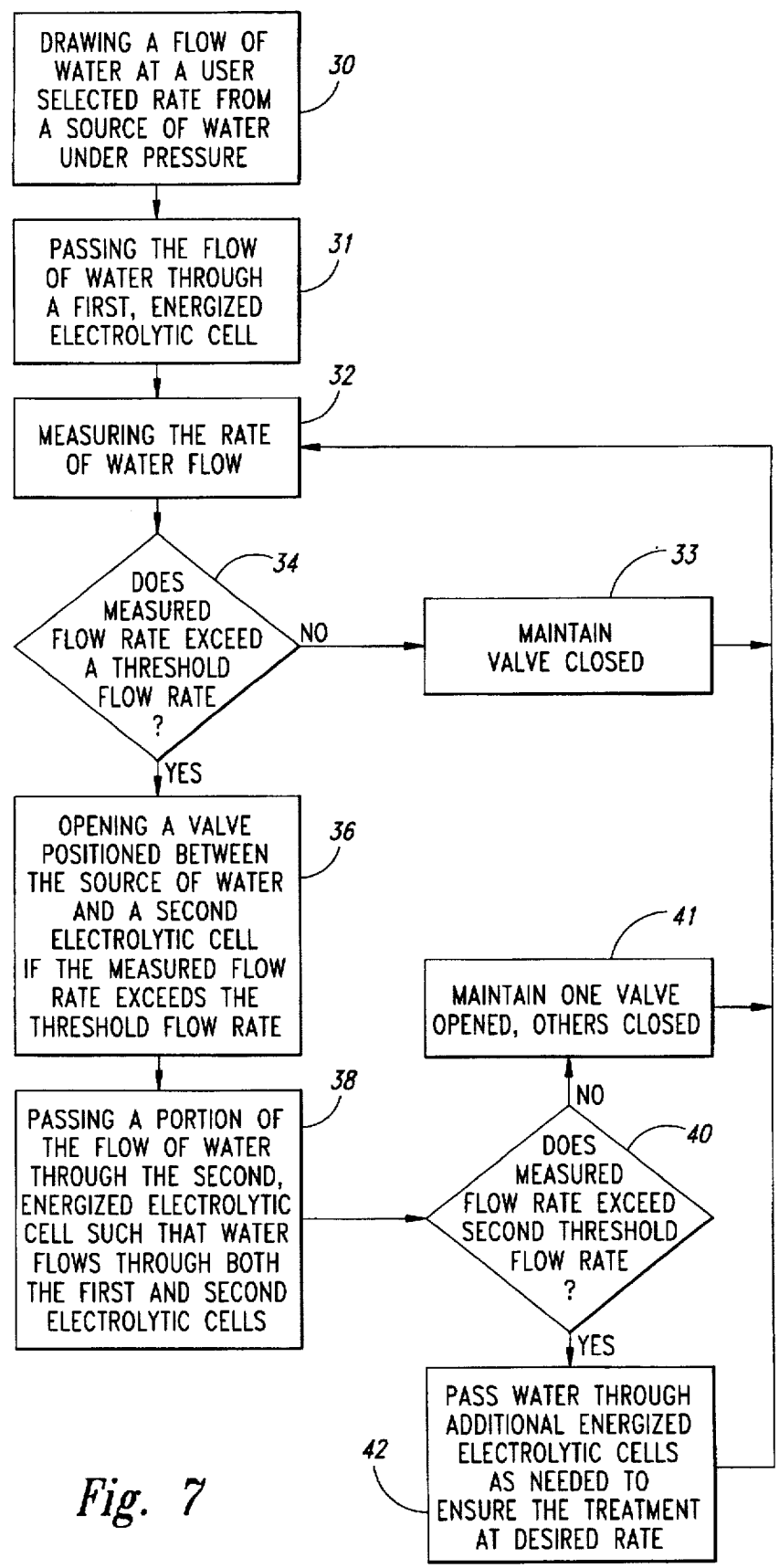
FIG. 7 is a schematic illustration of the steps of an embodiment of the present invention.

FIG. 7 is a flowchart which illustrates the basic steps of a method according to the present invention. As illustrated in step 30, a flow of water is drawn at a user desired rate from a source of water under pressure. The flow of water passes through a first, energized electrolytic cell in step 31. The rate of water flow is measured in step 32 and the measured flow rate is compared to a selected threshold flow rate in step 34. If the measured flow rate does not exceed the threshold flow rate, the system returns to continue measuring the rate of water flow. If the measured flow rate does exceed the threshold value, the system advances to step 36 and opens a valve between the source of water and a second electrolytic cell. Water is then passed through the second energized electrolytic cell simultaneously with it passing through the first energized electrolytic cell. The flow rate is then compared in step 40 to determine whether it exceeds a second threshold rate. The second threshold rate is set as that which is acceptable for the two electrolytic cells combined. If the answer is no in step 40, then the system confirms all additional valves are closed, step 33, and returns to step 32 and continues to measure the rate of water flow as provided to the user. If the answer is yes, then additional valves are opened and the water is passed through additional energized electrolytic cells as needed, step 42, to ensure treatment at the desired rate. The process then returns to the step of measuring the rate of water flow. As will be appreciated, step 42 may include an additional one or more threshold levels, such as a third threshold level and a third electrolytic cell, a fourth threshold level and a fourth electrolytic cell, and so on. Also, some sensors may measure water flow rate continuously, such measuring and continuous updating being within the scope of the invention.

When the flow rate does not exceed the threshold step of 34, 40 or 42, then the system returns to the prior state. For example, if the system exceeds the first threshold flow rate of step 34 but does not exceed the threshold flow rate of step 40, then one valve is opened and the other valves are maintained closed as indicated in step 41. If the flow rate further decreases such that it does not exceed the first threshold value in step 34, then all valves are maintained closed and the system returns to operation using only a single electrolytic cell 16.

Figure 3:
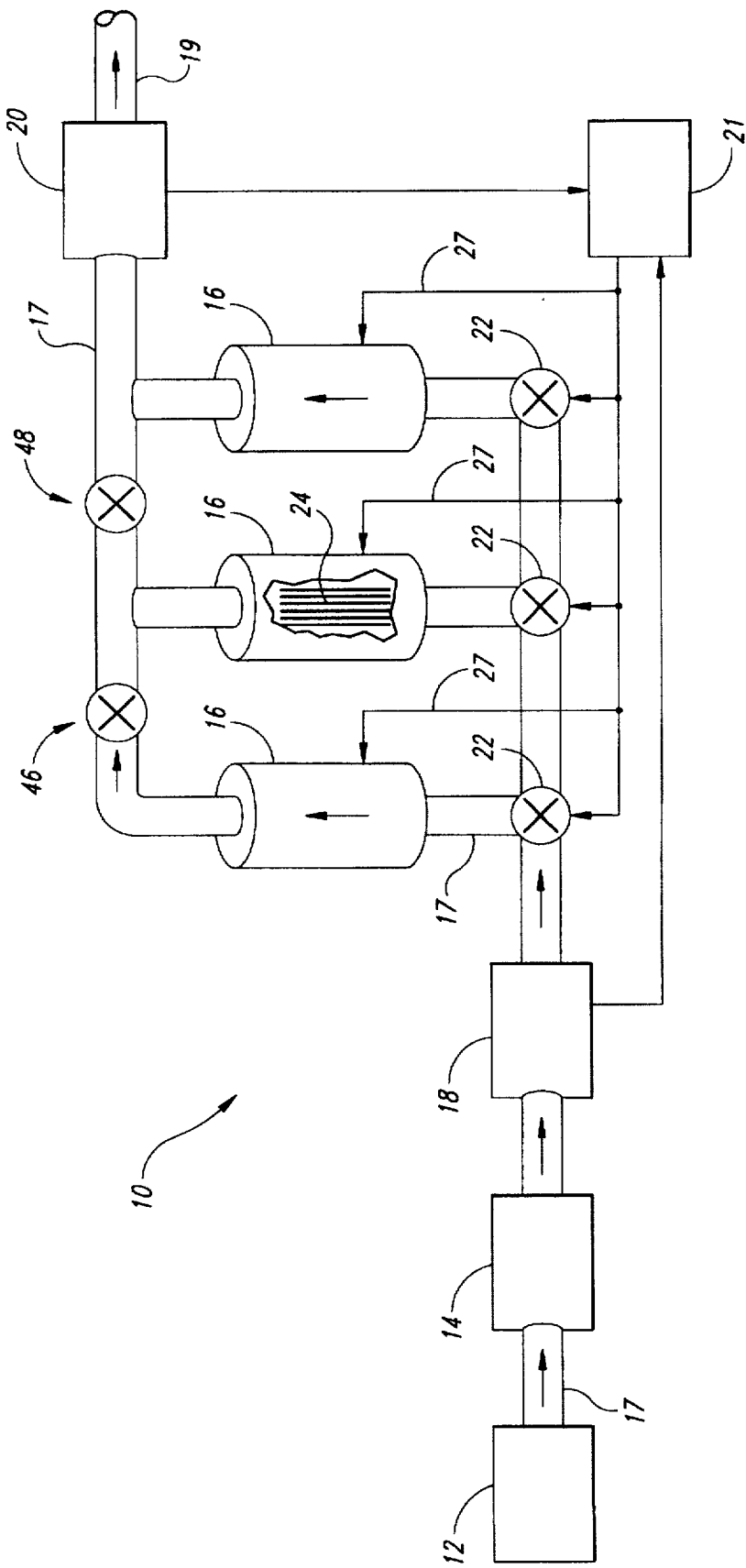
FIG. 3 is a schematic of a system provided in accordance with an alternative embodiment of the present invention.

FIG. 3 is an alternative embodiment of a system according to principles of the present invention. The same basic operating principles and same basic method described with respect to FIG. 7 apply to the embodiment of FIG. 3. Some additional features are provided for the convenience of the user and the system operator. According to the embodiment of FIG. 3, the flow rate sensor 18 is positioned at the inlet to the electrolytic cells rather than at the outlet. Of course, it could also be provided at the outlet in this and any of the other embodiments, this position being shown for illustrative purposes only. Similarly, a pump 14 may be provided to ensure that the pressure from the source of water 12 is always maintained at the desired level.

Connected to the outlet line 17 of the electrolytic cells is a dissolved oxygen sensor 20. The dissolved oxygen sensor 20 is an instrument which is well known in the art. In the embodiment of FIG. 2, and in many other embodiments, measuring the flow rate and maintaining sufficient electrolytic cells to treat the water at that flow rate will be acceptable. However, in some systems an increased assurance that the dissolved oxygen is above a desired level is desired. In these systems, a dissolved oxygen sensor is positioned in the water flow. The dissolved oxygen sensor provides an output signal to the electronic unit 21. The flow meter 18, if present, also provides input to the electronic control unit 21. As will be appreciated, in some embodiments in which the dissolved oxygen sensor 20 is provided, a flow meter 18 is not necessary and thus will not be in the system.

Alternatively, the source of water at a given site is tested to determine the characteristics of the water. The electrolytic cell is then calibrated or designed for use in that environment to treat the water. The cell generates a known increase in dissolved oxygen for the specified flow characteristics. Measuring the flow rate is thus sufficient to determine the final dissolved oxygen content.

When the dissolved oxygen exiting to the user 19 falls below a desired threshold value, the electronic control system 21 causes one or more valves 22 to open to increase the number of electrolytic cells providing treatment to the flow of water. The electronic control line also provides direct control via wires 27 to the electrolytic cells 16 to ensure that the power is being provided at the desired rate. The electronic control unit may therefore increase or decrease the power or terminate it completely to a particular cell, depending upon the demands of use on that particular cell.

The alternative embodiment of FIG. 3 also has an advantageous feature which permits the easy removal and cleaning of one or more electrolytic cells 16. Additional valves 46 and 48 are provided. These valves 46 and 48 may be under control of a separate system, such as a user directly turning the valve or some other electronic system. The valves 46 and 48, used in conjunction with valves 22, permit a single electrolytic cell to be isolated from the rest of the system. This is advantageous to ensure uniform use of the electrolytic cells or, for example, to permit removal of one cell for cleaning.

During normal long term operation, the electrolytic cell 16 may be used the majority of the time and the second and third electrolytic cells used only occasionally. This excessive use of one electrolytic cell will increase the wear on that cell. Accordingly, at selected times it will be desirable to use another one of the electrolytic cells as the primary cell and the first cell as the secondary cell. For example, each day the primary cell may rotate from one cell to the other so that on the first day the first electrolytic cell is the primary cell, and the other two are the secondary cells. On the second day, the second electrolytic cell is the primary cell and the third and first cells am the backup cells, respectively. On the next day, the third electrolytic cell is the primary cell and the first and second electrolytic cells are the backup cells, respectively. The time period can be one day, as stated, one week, several hours, or any other selected time period.

As can be seen, by closing valve 46, closing the first valve 22 to the first electrolytic cell and opening the first valve 22 to the downstream line 17, while holding the second valve 22 open to the second electrolytic cell only, the second electrolytic cell becomes the primary cell and there is no fluid flow through the other two electrolytic cells. In one embodiment, valves 46 and 48, as well as valves 22, are under direct control of the electronic control unit 21 to ensure uniform use of all electrolytic cells over a long term period. In another alternative embodiment, valves 46 and 48 are under the manual control of the system operator so that the system operator selects which of the electrolytic cells is the primary cell for a given time period.

The additional valves also permit the system operator to provide service and maintenance to the system without disrupting the flow of dissolved oxygenated water. For example, if it is desired to remove the first electrolytic cell 16 for cleaning or maintenance, then the appropriate valves can be closed so that the system continues to operate with the first electrolytic cell removed from the system. After the user has completed the maintenance of the first electrolytic cell, they may place it back into the system and open valve 46 while closing the first valve 22 to the downstream line 17 so that the first electrolytic cell once again carries a flow of water therein. As will be appreciated in the embodiment of FIG. 3, the valve 22 is a three way valve which can be turned to permit water flow only to the first electrolytic cell 16, to the line 17 further downstream, or to both the first electrolytic cell 16 and to the downstream line simultaneously. Valves of this type are well known in the art.

Figure 4:
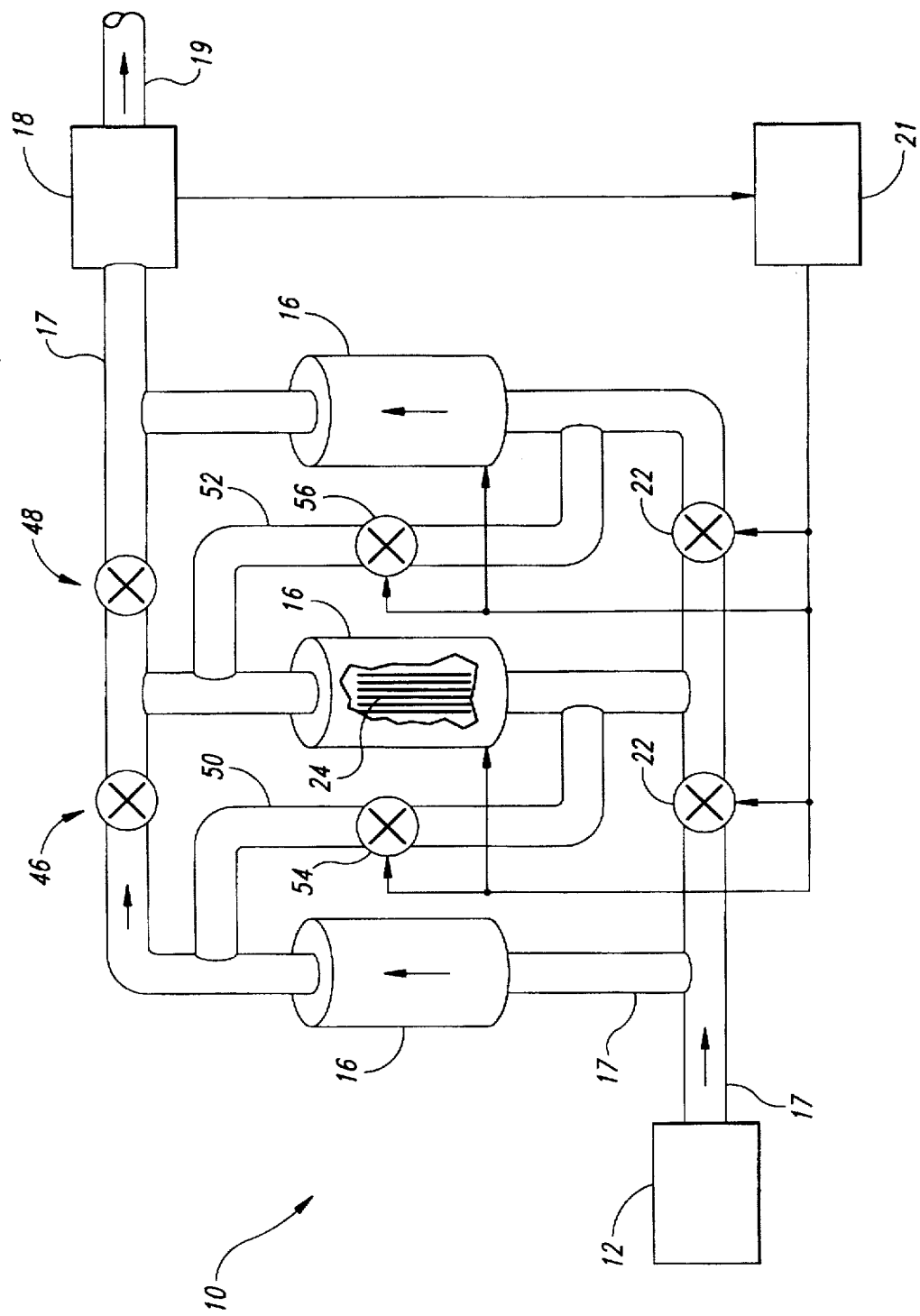
FIG. 4 is a schematic of a system provided in accordance with an alternative embodiment of the present invention.

FIG. 4 illustrates a further alternative embodiment according to principles of the present invention. According to the embodiment of FIG. 4, an additional pipe 50 is provided from the outlet of the first electrolytic cell to the inlet of the second electrolytic cell. Similarly, additional pipe 52 is connected from the outlet of the second electrolytic cell 16 to the inlet at the third electrolytic cell 16. The appropriate valves 54 and 56 are provided in the lines 50 and 52, respectively.

Valves 54 and 56 are also operated under control of the electronic control unit, or manually according to the desires of the system operator. It will be understood that all valves described herein, including 46, 48, 54 or 56 are any acceptable valve, such as a solenoid valve of a type well known in the art which may be opened and closed under the control of an electronic signal or manually controlled. The additional pipes 50 and 52 with the respective valves 54 and 56 permit the system to be configured in either the parallel or series configuration. As will be appreciated, if the first valve 22 is closed and the valve 54 is also closed, the valve 46 is left open and the water passes through a single electrolytic cell 16. If one or more valves 22 are opened while valves 54 or 56 remain closed, then the water passes in a parallel arrangement through the other electrolytic cells as can be seen by viewing FIG. 4. On the other hand, if one or more valves 22 are closed and valve 54 or valve 56 are opened, then the water is required to pass in a series arrangement from the first electrolytic cell 16 to the second electrolytic cell 16 before exiting via line 17 for delivery to the user on line 19. Closing valves 46 and 48 will ensure that only a series flow is permitted for 100% of the water. Leaving valve 46 open while opening valve 54 and closing valve 22 permits some of the water to be treated twice while other of the water is treated only once. The water is then mixed in line 17 so that the desired treatment level is reached. Similar results can be achieved by appropriately opening or closing valves 48, 56 and the second valve 22. The embodiment of FIG. 4 provides the system operator a great deal of flexibility in regulating the flow of water through the various electrolytic cells to provide a desired treatment level for output to the user through line 19.

As will be appreciated, the different electrolytic cells may be made of different sizes, or of different materials. For example, a first electrolytic cell may be twice as large as the second electrolytic cell. Or, one of the electrolytic cells may consume considerably more current than the other electrolytic cells because of the electrode spacing or other arrangements. Accordingly, a customized treatment level may be achieved by the system operator by switching one or more of the electrolytic cells into the treatment line.

FIG. 5 illustrates a further alternative embodiment in which the electrolytic cells are connected in series. The same basic operating principles and same basic methods described with respect to FIG. 7 apply to the embodiment of FIG. 5, although steps 33, 36, and 41 are not required. According to this alternative embodiment, the water flows through the pipes 17 sequentially, in a series arrangement through each of the electrolytic cells 16. The flow rate meter 18 may be positioned at the inlet or the outlet. Similarly, the dissolved oxygen meter 20 may also be positioned at the outlet of the system. The appropriate signals, whether from flow rate meter 18 or dissolved oxygen meter 20, are provided to the electronic control unit 21. The electronic control unit 21 controls the operation of the electrolytic cells 16 to achieve the desired treatment level. For example, at a high flow rate the electronic control unit 21 will cause power to flow through all electrolytic cells simultaneously to provide a series treatment of the water passing through the line 17. If the flow rate is below a threshold level, then the power is only provided to one of the electrolytic cells and the other two electrolytic cells are turned off even though water passes therethrough. There is thus a savings of power and also wear and maintenance on the unused electrolytic cells. In the event the flow rate increases above the threshold level (or the dissolved oxygen level drops below the threshold level), then the electronic control unit 21 provides power to one or more electrolytic cells 16 in series so that the dissolved oxygen level increases. Of course, the cell that is selected as the primary cell may be changed to provide even usage of the cells. The first cell may be the primary cell with the other two being switched in as the secondary cells, or the middle cell may be the primary cell.

FIG. 6 illustrates a further alternative embodiment according to principles of the present invention. According to this alternative embodiment, a valve 60 is positioned between the first and second electrolytic cells and the valve 62 is positioned between the second and third electrolytic cells. The valves 60 and 62 are valves of the type which permit water to be shut off completely, water to flow through only one of the selected outlets at any one time, or water to flow through both outlets simultaneously from a single inlet. The electronic control system 21, based on sense measurements received from either a flow rate sensor 18, a dissolved oxygen meter 20, or both, controls the valves 60 and 62 to achieve the desired treatment level. Accordingly, the water can be treated through a single electrolytic cell before being passed to the outlet, or can be directed to pass in series through one or more electrolytic cells, or partially in series and partially in parallel. The embodiment of FIG. 6 has the advantage of simplicity in that very few valves and pipes are required to achieve proper treatment over a wide range of water flow levels.

According to one preferred embodiment, an electrolytic cell of the present invention has 15 number of electrodes therein. The electrodes are flat, having a length of 12 inches and a width of 2 inches. They are coupled to a current source which is capable of supplying current in the range needed for that particular cell. Some applications will operate within the range of 1–20 amperes while other applications may be in the range of 1–50 amperes. For larger scale applications the amperage may be in the thousands. As will be appreciated, electrodes of various sizes, shapes and configurations could be used in accordance with the present invention. Operating conditions may also be varied. For example, it may be possible to achieve the same dissolved oxygen content as one system that passes a given current across cells of a given size by using smaller cells and a higher current.

Any of the configurations herein may also be used to provide an increased level of dissolved oxygen at a selected flow rate. For example, a user may wish to increase the dissolved oxygen level from 15 ppm to 18 ppm at a constant flow rate. The system can therefore be programmed to switch the other cells on to increase the oxygen.

A method and apparatus for generating a volume of oxygenated water have been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

We claim:

1. An apparatus for generating a volume of oxygenated water, comprising:

a source of water under pressure;

an outlet through which the water is delivered to the user at a user selected flow rate;

a plurality of electrolytic cells coupled between said source of water and said outlet, such that a volume of water drawn from the source of water through the outlet passes through at least one electrolytic cell at the user selected flow rate;

a flow meter coupled to measure the flow rate of the water;

control means for causing the water to pass through one or more additional electrolytic cells if the flow rate as measured by said flow meter exceeds a threshold flow rate; and an electric power source for providing electric power to energize said electrolytic cells through which water is passing.

2. The apparatus according to claim 1 wherein the plurality of electrolytic cells are coupled together in a parallel arrangement.

3. The apparatus according to claim 1 wherein a valve is positioned between two successive electrolytic cells, the valve being closed if the user selected flow rate does not exceed the threshold flow rate, the volume of water flowing through a first energized electrolytic cell to the outlet, the valve being opened if the user selected flow rate exceeds the threshold flow rate, thereby allowing water to flow through more than one energized electrolytic cell to the outlet.

4. The apparatus according to claim 3 wherein the control means further includes an electronic control system coupled to the flow meter and to each valve.

5. The apparatus according to claim 3 wherein the plurality of electrolytic cells are coupled together in a parallel arrangement, and a conduit is provided between an outlet of a first electrolytic cell and the inlet of the next electrolytic cell, the conduit being provided with a second valve, a third valve being provided downstream of the electrolytic cell and the conduit, the valves being selectively opened and closed to allow water to flow through the electrolytic cells in series, in parallel, or in both.

6. The apparatus according to claim 1 wherein each electrolytic cell contains a plurality of electrodes having a length of 6–12 inches and a width of 1.5–2 inches, the electrodes being coupled to a source of current of 1–20 amperes, the selected rate of flow through each electrolytic cell being 0.25–25 gallons per minute.

7. The apparatus according to claim 1, further comprising a pump in fluid communication with the source of water.

8. The apparatus according to claim 1 wherein said control means includes an electronic control system coupled to said electrolytic cells.

9. The apparatus according to claim 1, further comprising a dissolved oxygen meter provided downstream of the electrolytic cells.

10. The apparatus according to claim 1 wherein a valve is positioned at an inlet and at an outlet of each electrolytic cell, the valves being selectively opened and closed to direct or block the flow of water through a given electrolytic cell.

11. The apparatus according to claim 1 wherein the plurality of electrolytic cells are coupled together in series, such that water flowing from the source of water passes through the length of each successive electrolytic cell prior to being discharged at the outlet.

12. The apparatus according to claim 11, further comprising an electronic control system coupled to the flow meter and to the electrolytic cells, the control system energizing and de-energizing the electrolytic cells as necessary to maintain a desired level of dissolved oxygen in the water at the outlet.

13. A method for generating a volume of oxygenated water, comprising:

drawing a flow of water at a user selected flow rate from a source of water under pressure;

passing the flow of water through a first energized electrolytic cell;

measuring the flow rate of the water;

comparing the measured flow rate to a threshold flow rate;

opening a valve positioned between the source of water and a second energized electrolytic cell if the measured flow rate exceeds the threshold flow rate; and passing the flow of water through the second energized electrolytic cell such that water flows through both the first and second energized electrolytic cells.

14. The method according to claim 13, further comprising:

comparing the user selected flow rate to a second threshold flow rate; and passing the flow of water through a third, energized electrolytic cell to ensure that the flow rate through each of the electrolytic cells does not exceed a threshold flow rate for each electrolytic cell.

15. A method for generating a volume of oxygenated water, comprising:

forcing a volume of water through a plurality of electrolytic cells coupled together in series, such that the volume of water flows from the outlet era first electrolytic cell into an inlet of a second electrolytic cell;

measuring the dissolved oxygen content of the volume of water as it exits each of the electrolytic cells;

energizing with electric current a selected one of the electrolytic cells through which water is passing such that the dissolved oxygen content of the volume of water reaches a desired value;

increasing the water flow rate until the oxygen content is below the desired value; and energizing with electric current at least one additional electrolytic cell if the measured oxygen content is below the desired value.

16. The method according to claim 15, further comprising directing the volume of water to an outlet when the dissolved oxygen content of the volume of water is equal to or greater than the desired value.

17. A method for generating a volume of oxygenated water, comprising:

drawing a volume of water at a user selected flow rate through a plurality of electrolytic cells coupled together in series, such that the volume of water flows from the outlet of a first electrolytic cell into an inlet of a second electrolytic cell, the first electrolytic cell being energized;

measuring the user selected flow rate;

comparing the measured flow rate to a threshold flow rate; and energizing at least one additional electrolytic cell if the measured flow rate exceeds the threshold flow rate.

18. The method according to claim 17, further including:

changing the position of a valve between the first and second electrolytic cells to cause at least a portion of the water to flow from the first electrolytic cell to the outlet.

* * * * *